Dec. 4, 1951 C. W. REDIN 2,577,630
MACHINE FOR MAKING WOOD FLOORING BLOCKS
Filed May 27, 1948 10 Sheets-Sheet 1

INVENTOR.
CLIFTON W. REDIN
BY
Clarence B. DesJardins
HIS ATTORNEY

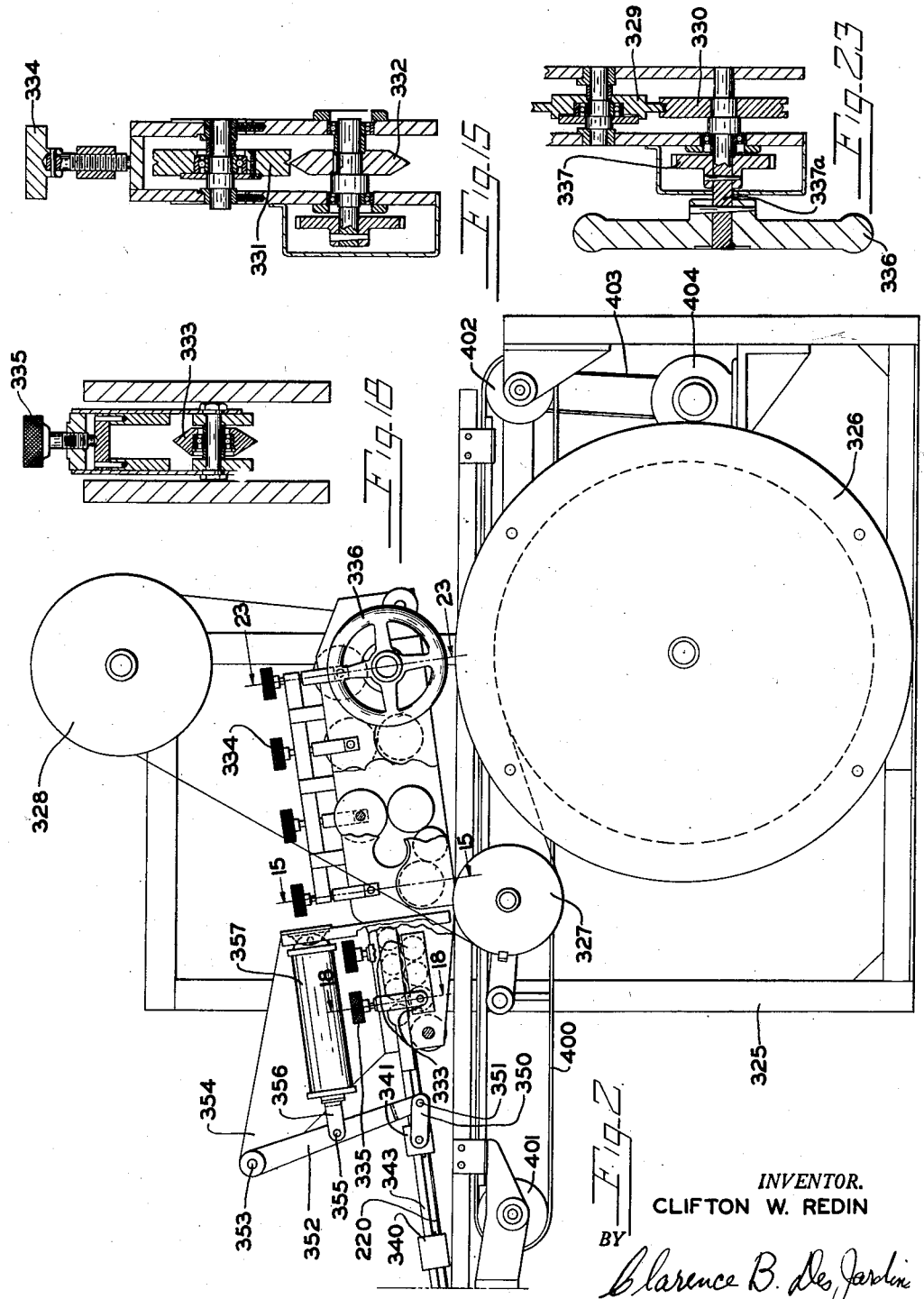

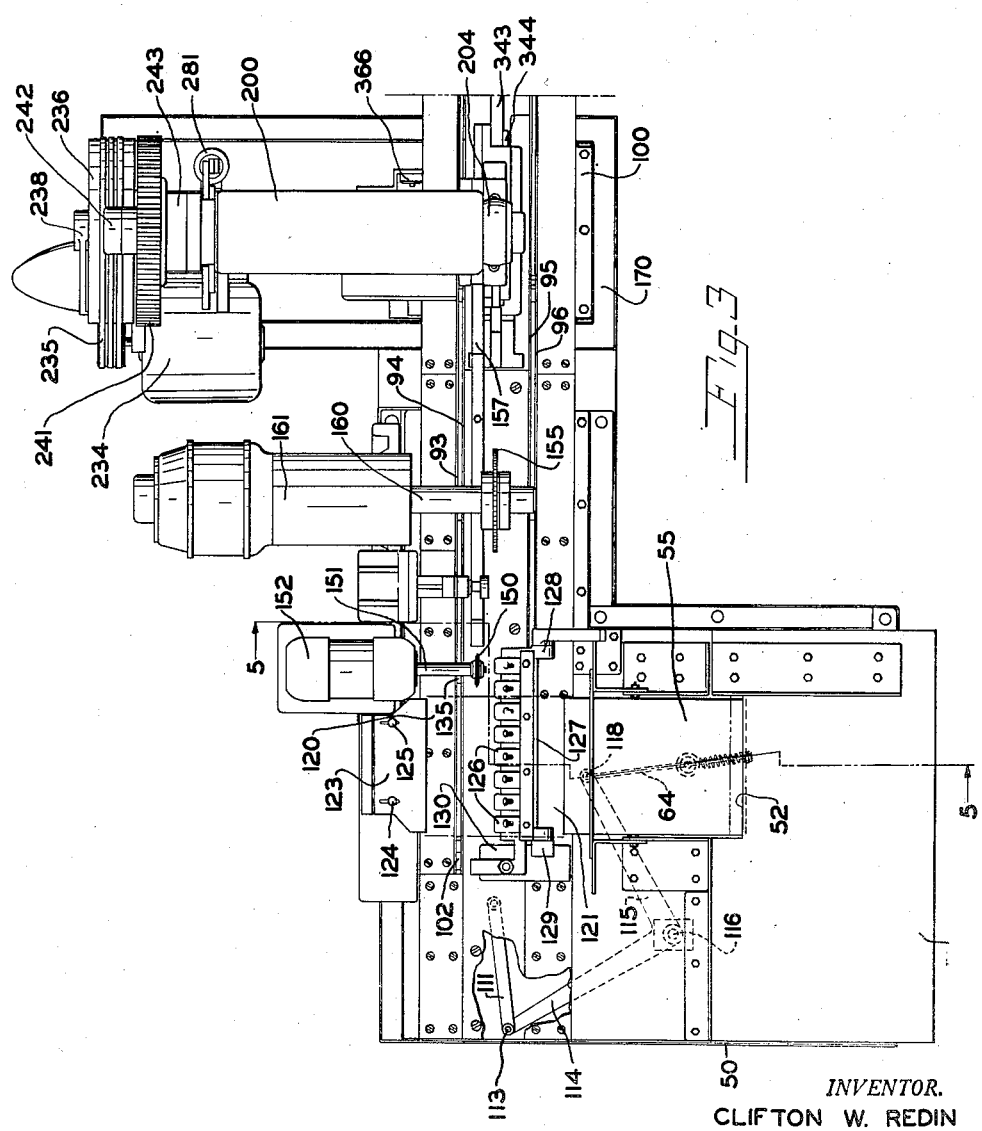

Dec. 4, 1951  C. W. REDIN  2,577,630
MACHINE FOR MAKING WOOD FLOORING BLOCKS
Filed May 27, 1948  10 Sheets-Sheet 4
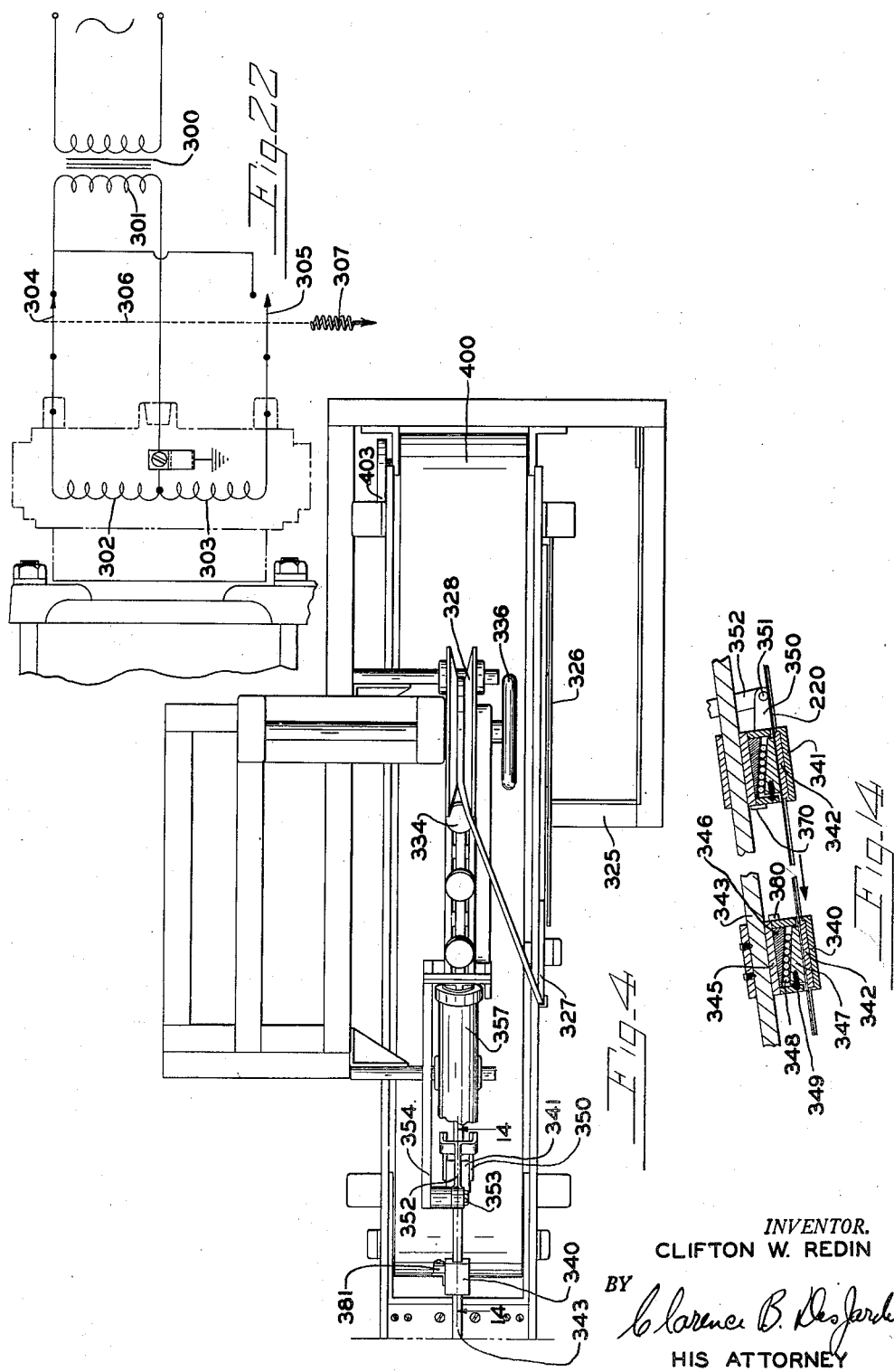
INVENTOR.
CLIFTON W. REDIN
BY Clarence B. Desjardins
HIS ATTORNEY Dec. 4, 1951 C. W. REDIN 2,577,630
MACHINE FOR MAKING WOOD FLOORING BLOCKS
Filed May 27, 1948 10 Sheets-Sheet 5
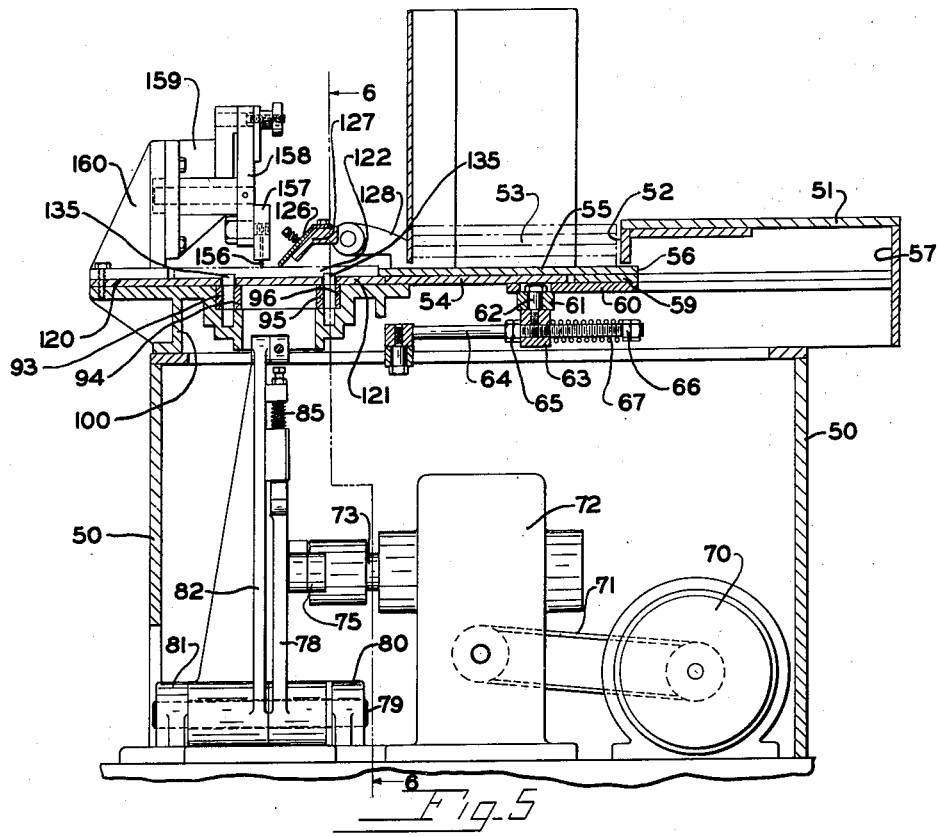
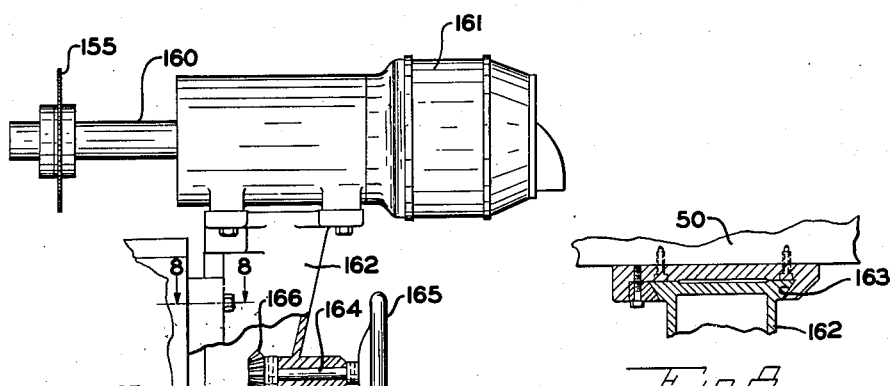
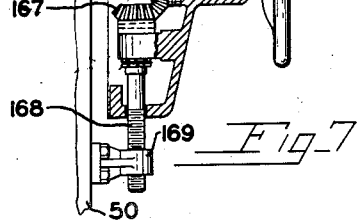
INVENTOR.
CLIFTON W. REDIN
BY
Clarence B. DesJardins
HIS ATTORNEY Dec. 4, 1951 C. W. REDIN 2,577,630
MACHINE FOR MAKING WOOD FLOORING BLOCKS
Filed May 27, 1948 10 Sheets-Sheet 6
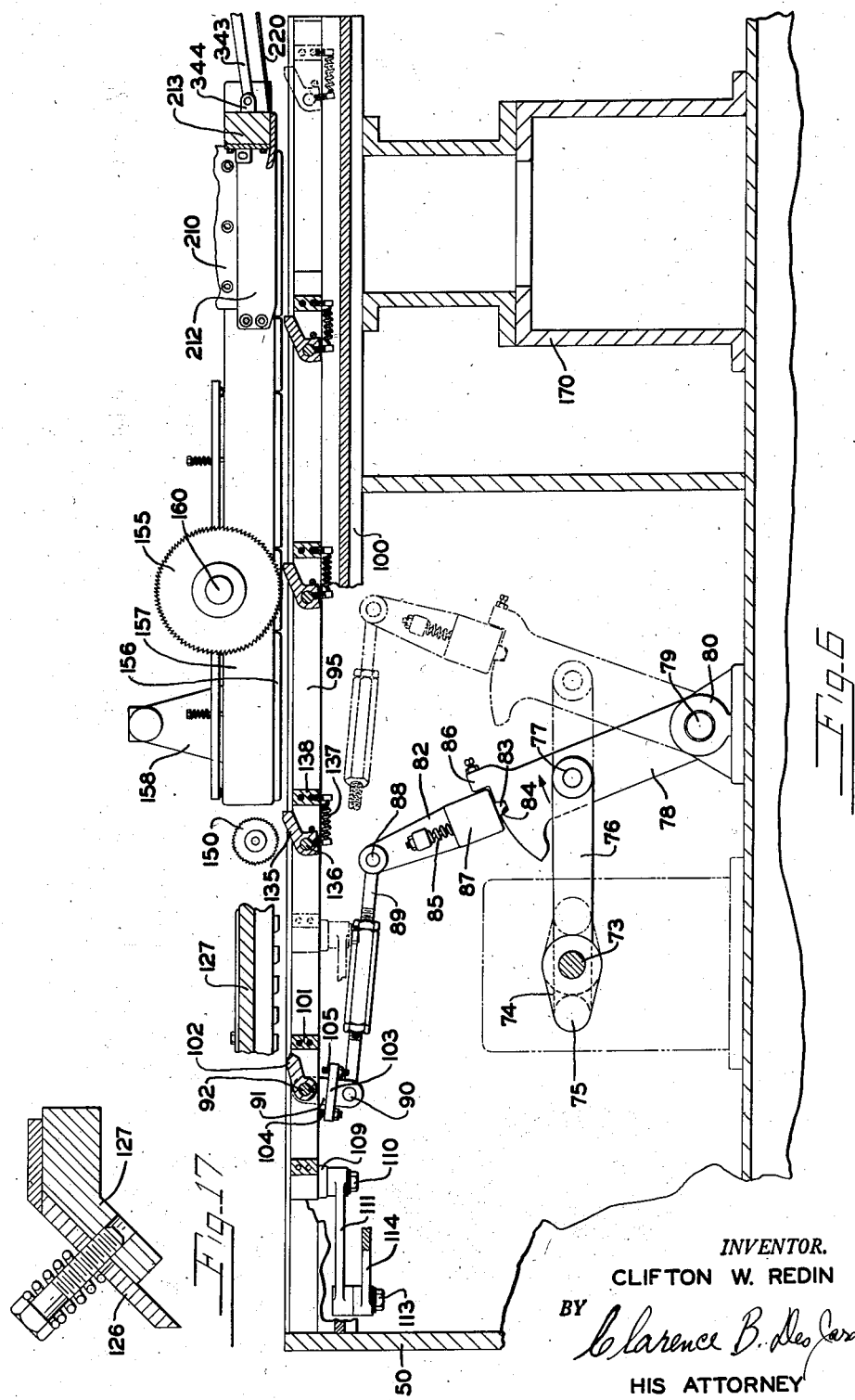
INVENTOR.
CLIFTON W. REDIN
BY Clarence B. DesJardins
HIS ATTORNEY Dec. 4, 1951     C. W. REDIN     2,577,630
MACHINE FOR MAKING WOOD FLOORING BLOCKS
Filed May 27, 1948     10 Sheets-Sheet 7
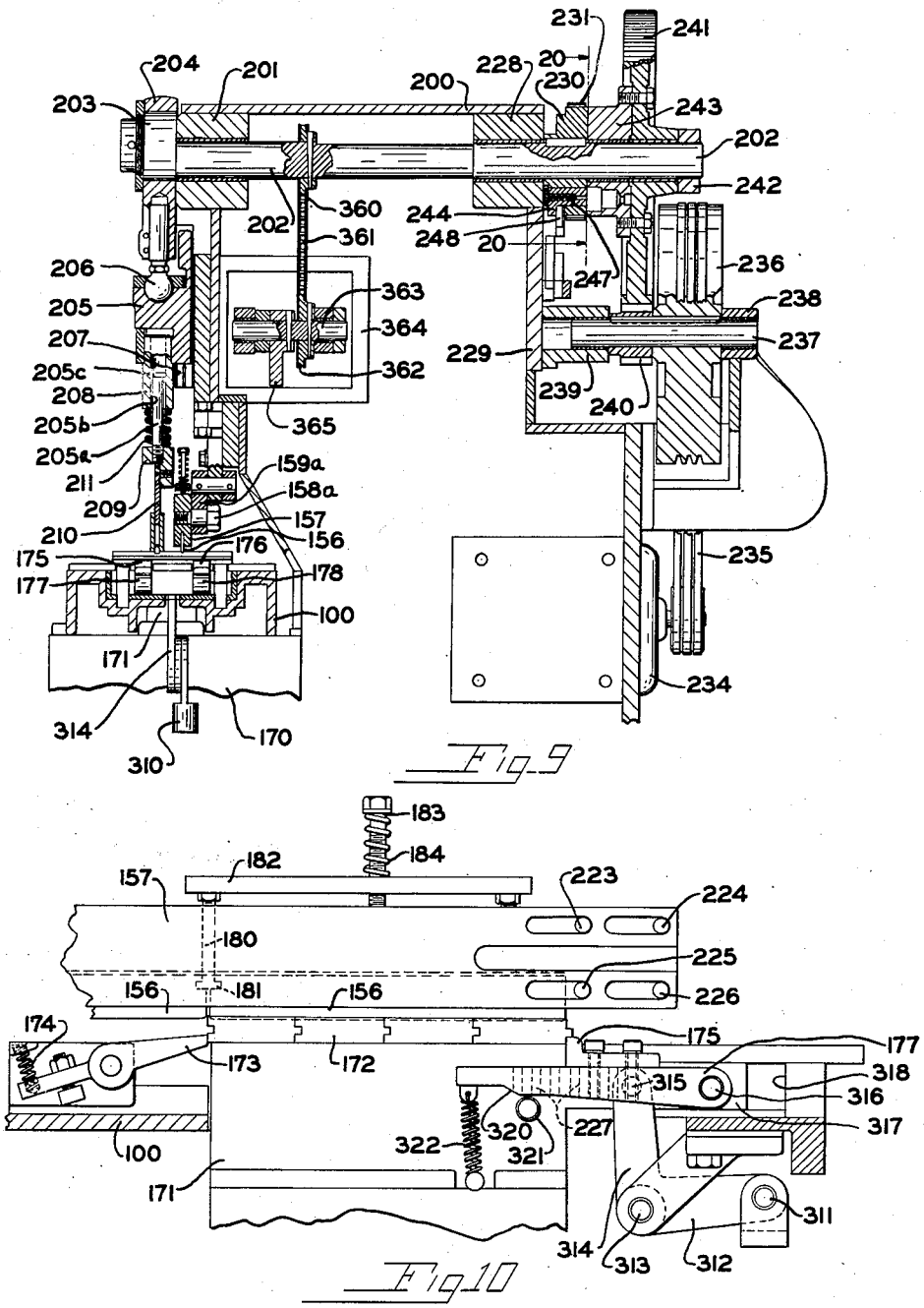
INVENTOR.
CLIFTON W. REDIN
BY
HIS ATTORNEY Dec. 4, 1951 C. W. REDIN 2,577,630
MACHINE FOR MAKING WOOD FLOORING BLOCKS
Filed May 27, 1948 10 Sheets-Sheet 8

*INVENTOR.*
CLIFTON W. REDIN
BY Clarence B. DesJardins
HIS ATTORNEY

Dec. 4, 1951 C. W. REDIN 2,577,630
MACHINE FOR MAKING WOOD FLOORING BLOCKS
Filed May 27, 1948 10 Sheets-Sheet 9
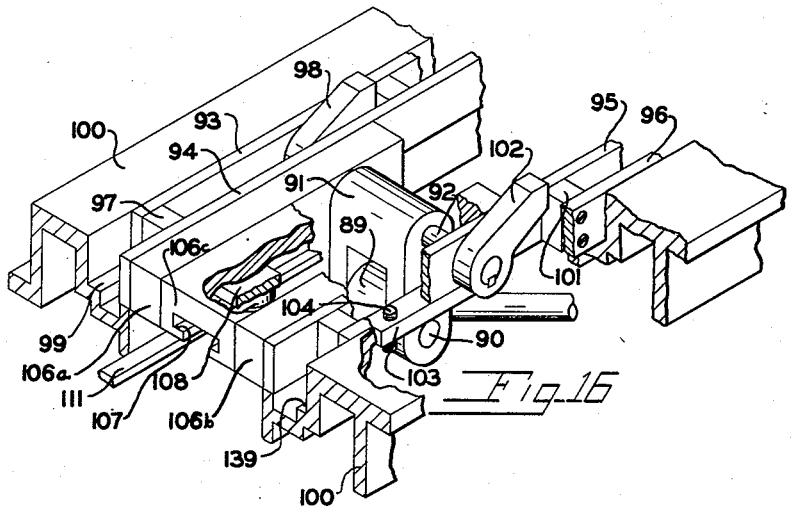
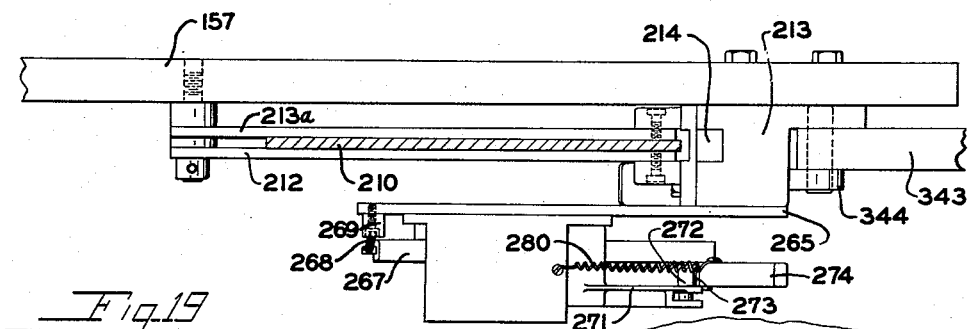
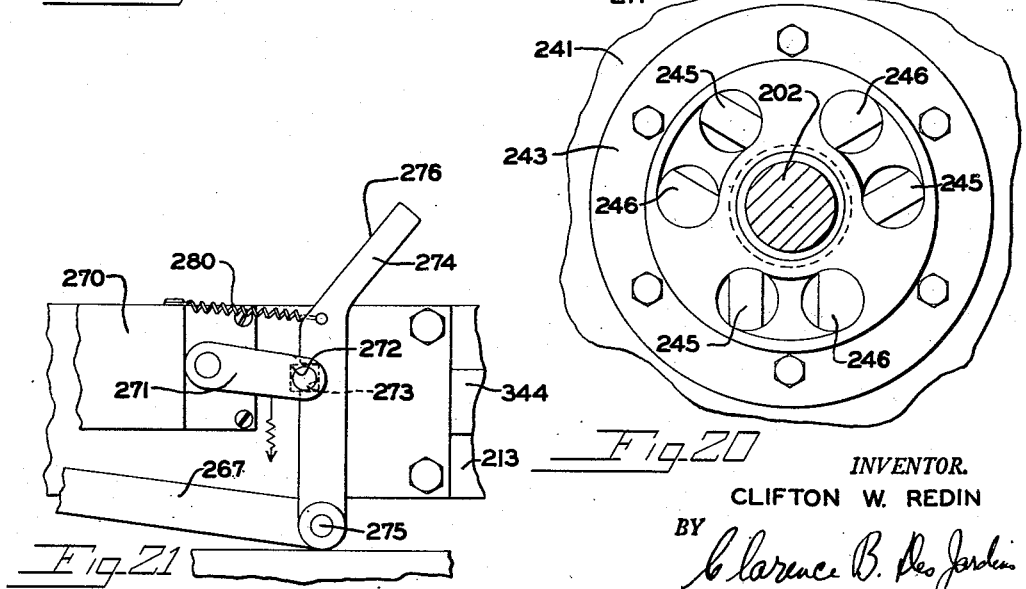
INVENTOR.
CLIFTON W. REDIN
BY
Clarence B. DesJardins
HIS ATTORNEY Dec. 4, 1951  C. W. REDIN  2,577,630
MACHINE FOR MAKING WOOD FLOORING BLOCKS
Filed May 27, 1948  10 Sheets-Sheet 10
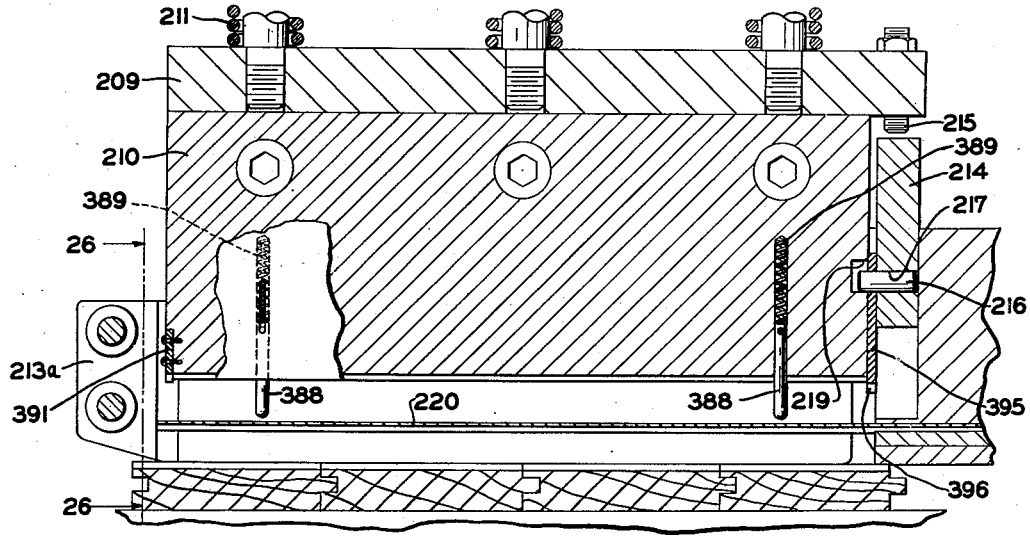
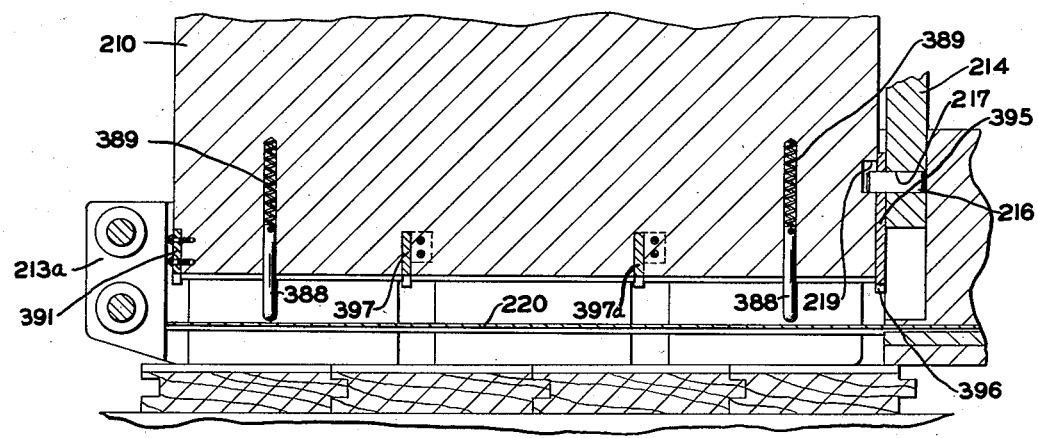
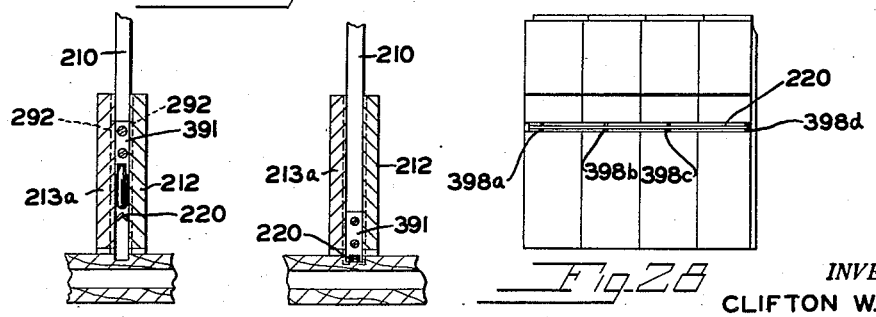
INVENTOR.
CLIFTON W. REDIN
BY
HIS ATTORNEY Patented Dec. 4, 1951

2,577,630

UNITED STATES PATENT OFFICE 2,577,630

MACHINE FOR MAKING WOOD FLOORING BLOCKS

Clifton W. Redin, Rockford, Ill., assignor to Bradley Lumber Company of Arkansas, Warren, Ark., a corporation of Arkansas Application May 27, 1948, Serial No. 29,566

22 Claims. (Cl. 144—3)

This invention relates to a machine for making wood flooring blocks, and more particularly pertains to such a machine which inserts and fastens a metal spline in a channel cut across the rear surface of a unit assembled of narrow pieces of flooring loosely joined edge to edge by tongue and groove edge formations, said spline securely holding the pieces of a unit together in their assembled condition to form a flooring block. In the machine, successive unit assemblies of wood pieces, each unit assembly intended to comprise a block, are carried, one at a time, by a reciprocating conveyor, past various stations at which certain operations, to be described, are performed. First, an assembly of wood boards, or strips, is carried under a saw which forms, across the boards, a narrow cut in which a conveyor guide blade rides to keep the boards of an assembly in alignment as they move to the various stations. Then such assembly of boards is moved under a channel-cutting saw to form the channel in which the transverse spline is to be positioned and pressed. Next, an assembly of boards is brought to a press station whereat the assembly is clamped tightly together, a spline previously fed over the spline-receiving channel is forced thereinto by a pressing head which has associated therewith a knife which severs the spline to the proper length. The block, so formed, is then carried off the machine by a conveyor belt.

The reciprocating conveyor first moves backwardly to make engagement with the unit assemblies loaded thereon and then moves forwardly to move the unit assemblies forward, a step, so that the assemblies by repeated conveyor movements are brought one at a time to the spline pressing station.

In my machine I provide a novel combined spline press, spline feed, spline cut-off, and clamping device that operates on an assembly of boards at the pressing station, in a cycle of operation independent of the conveyor feed, so that as an assembly of boards is conveyed under the press a single cycle of operation is initiated and occurs which cuts a previously fed spline to length and then forces it into the channel and partially flattens it so it bites into the side walls thereof. A new length of spline is then fed for the next operation. The spline is of V-shaped cross-section and is pressed into the channel, free longitudinal edges first, by a plate-like pressing member notched longitudinally to fit the ridge of the spline. As the ridge is forced downwardly the spline spreads open so the free longitudinal edges bite into the side walls of the channel near the bottom thereof. To more firmly secure the spline, the pressing member has projections extending inwardly and downwardly from the sides of the longitudinal notch, so, at spaced points along its length the spline is forced downwardly into the wood.

The cycle of operation of the spline cut-off, spline pressing and spline feeding mechanism is initiated by the movement of a unit assembly of flooring pieces to the pressing station, the thickness of the boards tripping a sensing member positioned in the path thereof.

During the period when an assembly of boards is at the pressing station the whole cycle of operation resulting in the cutting off and pressing into the boards of the spline and the spline feeding for the next operation takes place. My novel mechanism insures that no such action of the spline cut-off, spline pressing and spline feeding mechanism occurs in the absence of an assembly of boards at the station.

Therefore, it is an object of this invention to provide a novel machine for making wood flooring blocks in a series of operational steps, performed in sequence, wherein assemblies of boards formed into block formation are secured together by the insertion of a metal spline into a transverse channel cut across the backside of the assembled boards.

Another object of the invention is to provide such a machine wherein the step by step feeding of unit assemblies of boards to the different operational stations is independent of the initiating and operating mechanism of the spline cut-off, spline pressing, and spline feeding mechanism.

A further object of the invention is to provide a machine for making wood flooring blocks, wherein a spline, forced into a channel to hold a group of boards assembled together, is secured firmly to prevent relative longitudinal movement of the spline and boards.

With these and further objects in view, which will become apparent from the description to follow, the invention will be described with reference to the drawings in which:

Figs. 1 and 2, together, show a side elevation of the machine.

Figs. 3 and 4, together, show a top plan view of the machine.

Fig. 5 is a vertical section across the machine on the line 5—5 of Fig. 3.

Fig. 6 is a longitudinal vertical section, taken on the line 6—6 of Fig. 5, of the beginning portion of the machine with certain parts broken away.

Fig. 7 is a detail view, of the channel saw and its regulating mechanism, certain parts being shown in section and certain parts shown broken away.

Fig. 8 is a partial detail view taken on the line 8—8 of Fig. 7.

Fig. 9 is a vertical transverse section through the press and press actuating mechanism taken on the line 9—9 of Fig. 1 certain parts being shown in full and others broken away.

Fig. 10 is a side view of a portion of the knife guide supporting means, and block assembly clamping means at the pressing station, parts being shown in section.

Fig. 14 is a broken sectional view through the two spline feeding grips.

Fig. 15 is a sectional view of one of the spline forming roller dies taken on the line 15—15 of Fig. 2.

Fig. 16 is a broken perspective view of the feed rail drive connections.

Fig. 17 is a detail sectional view showing the mounting of one of the retaining blades.

Fig. 18 is a sectional view taken on the line 18—18 of Fig. 2.

Fig. 19 is a broken section on the line 19—19 of Fig. 1.

Fig. 20 is a broken section taken on the line 20—20 of Fig. 9.

Fig. 21 is a broken side elevation of the cycle initiating sensing lever.

Fig. 22 is a diagram of the electric circuit for actuating the solenoid of the cycle initiating air motor.

Fig. 23 is a section taken on the line 23—23 of Fig. 2.

Fig. 24 is an enlarged longitudinal sectional view through the center of the pressing member.

Fig. 25 is similar to Fig. 24, but shows a modified construction of the presser member.

Fig. 26 is a partial sectional view taken on the line 26—26 of Fig. 24.

Fig. 27 is similar to Fig. 26, but shows the presser member in its lowered position.

Fig. 28 is a plan view of a group of boards held in assembled relation by a spline pressed into position by the presser member shown in Fig. 25.

In the drawings, the same reference numerals are applied to the same parts throughout the several views, and the sectional views are taken on the section lines looking in the direction of the arrows.

Figure 1:
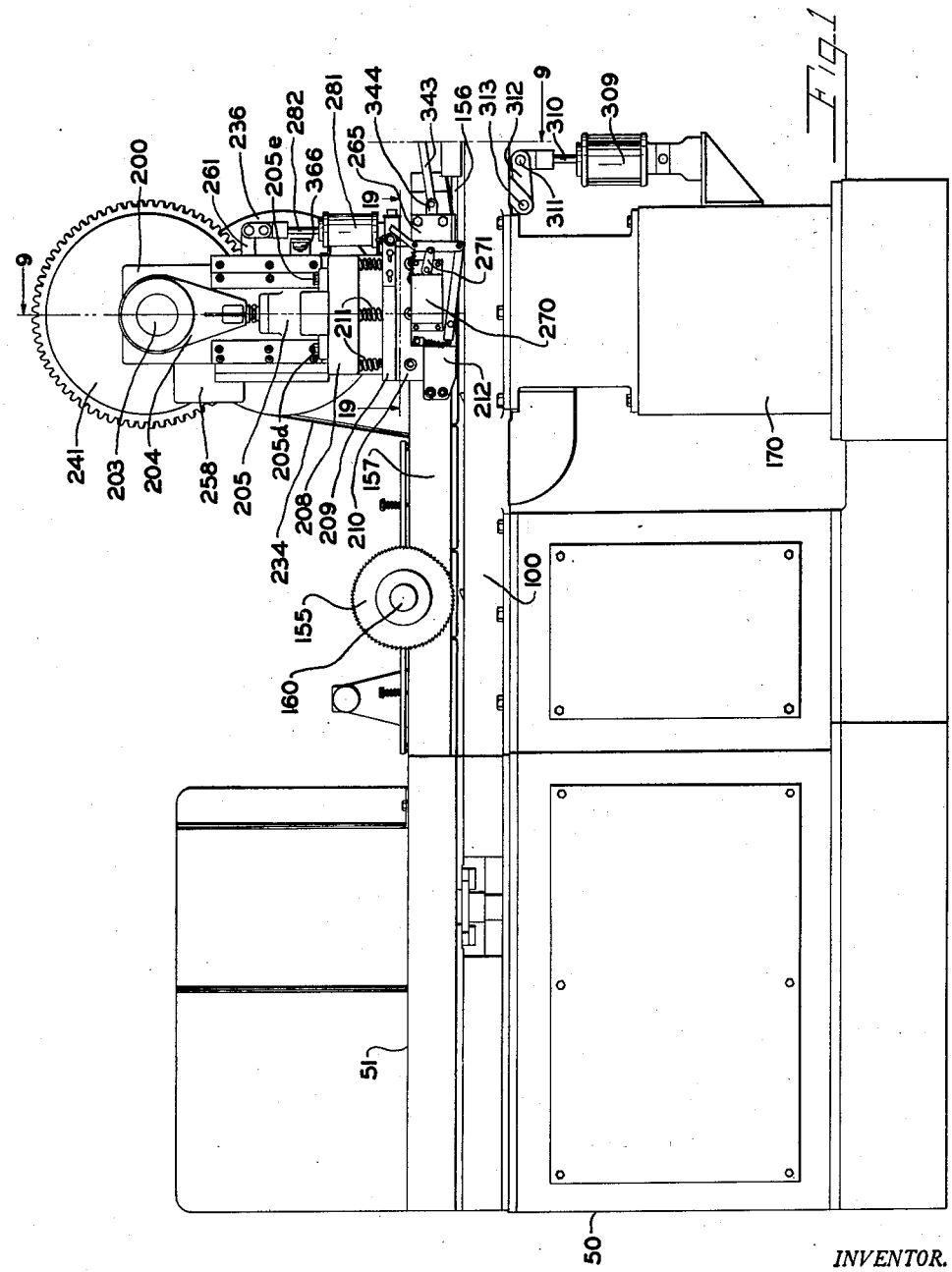

Referring, first, to Figs. 1 and 5, I provide a base framework 50 on which is supported a work table 51 having a well 52 to accommodate stacked assemblies of boards 53 placed therein by the operator. These assemblies of boards are strips of tongued and grooved flooring assembled edge to edge by the tongue and groove formations into a block, usually square, and of selected edge dimensions. The machine is adjustable for use with assemblies of different size. The bottom of well 52 is provided with a stationary floor 54 normally covered by a feed plate 55 slidable under table 51 to a pick-up position wherein the edge 56 of the feed plate approximates wall 57 forming a depending side of table 51 at which point the bottom one of the assemblies 53 may drop onto the top surface of floor 54 to be fed to the left as seen in Fig. 5 upon return of the plate to normal position. The feed plate 55 is screwed onto joinder block 59 which is welded to plate 60. Welded to the bottom of plate 60 is a bearing collar 61 holding a bolt 62 screwed into a collar 63 slidably mounted on a rod 64 between stop nut 65 and stop nut 66. Interposed between stop nut 66 and collar 63 is a snubbing spring 67, which, when rod 64 is shifted so as to move plate 55 in a feeding operation, will act as a cushion so that, if any block assembly jams, the driving connection with the feed plate will allow the driving mechanism, to be described, to be gradually brought to a halt, without any breakage of the parts. A constantly running motor 70 is connected by a belt 71 to a gear reduction box 72 which drives shaft 73 provided with an eccentric 74 (Fig. 6) pivoted at 75 to a link 76 pivoted at 77 to an arm 78 pivoted on an axle 79 held by hub members 80 and 81 (Fig. 5) secured in the frame 50. Also pivotally mounted on axle 79 is an arm 82 coupled to arm 78 by a pin 83 (Fig. 6), mounted in box 87, engaging in a slot 84. Pin 83, slidable in box 87, is resiliently urged outwardly into notch 84 by a spring 85 to make a coupling between members 78 and 82 that can be broken under excessive loads by reason of the chamfered contours on the engaging end of the pin 83. This coupling is breakable only when the arm 78 is moving from the full line to the dotted line position, as shown in Fig. 6, as in movement in the other direction an upwardly extending formation 86 on member 78 will engage block 87 within which the spring 85 and pin 83 are mounted. The purpose of this breakable coupling is to stop feeding motion of the conveyor system, to be described, in the event any of the block assemblies become jammed in the action of the machine. The upper end of member 82 is pivoted at 88 to an adjustable link 89 pivoted to a shaft 90 (see Fig. 16) which spans downwardly extending arms of a block 91 pinned to shaft 92 extending between and journaled in rails 93 and 94 on one side and in rails 95 and 96 on the other side. Rails 93 and 94 on one side extend the length of the machine as far as the pressing station and rails 95 and 96 on the other side extend the length of the machine as far as the pressing station parallel to rails 93 and 94. Rails 93 and 94 are joined together by spacers, like spacer 97, at intervals to form a framework within which feeding dogs, like feeding dog 98, are mounted and operated, in a manner to be described. The structure comprising rails 93 and 94, and their spacer elements are supported on a depressed surface 99 in a work table casting 100. In a like manner rails 95 and 96 are joined together by spacers, like spacer 101, to form a structure in which feeding dogs, like feeding dog 102, are mounted. Feeding dogs 98 and 102 form the first pair of feeding dogs by which assemblies of boards fed onto the conveyor are first moved in the work direction. Feeding dogs 98 and 102 are also pinned to shaft 92 so that, as link 89 (see Fig. 6 also) moves first in one direction and then the other, the dogs 98 and 102 will alternately be retracted within the spacer between the rails and then raised above the rails to the position seen in Fig. 16. The retracted position of these dogs is represented in Fig. 6 by the position of dog 102 which shows the link 89 and the conveyor system comprising the rails 93, 94, 95 and 96 in the full return stroke, or pick-up, position. Welded on one side of block 91 is a block 103 having settable stop screws 104 and 105 mounted therein to adjust the retraction and raising of the dogs 98 and 102 in a complete excursion of the conveyor system. The system of rails 93, 94, 95 and 96 are thus driven through block 91. It will be understood that dogs 98 and 102 are, thus, positively retracted and extended during a cycle of operation of the conveyor mechanism. Rails 93 and 94 coupled together and rails 95 and 96 coupled together are joined by blocks 106a and 106b on opposite sides of a block 106c (Fig. 16) having a slot 107 cut in the bottom thereof to receive a block 108 slidably mounted therein and secured at a selected place by means of a stud 110 which passes through a collar 109 to permit the conveyor to be adjusted in its stroke, so as to accommodate the particular size of block assembly which is being manufactured at that time. Extending downwardly from block 108 is a hub 109 (Fig. 6) into which a bolt 110 is screwed and on which bolt a link 111 is pivoted. The other end of link 111 has a pivot bolt 113 screwed thereinto on which an arm 114 of a bell crank lever is pivoted. Referring to Fig. 3, the other arm 115 of the bell crank lever which is pivoted at 116 to the base 50, is pivoted at 118 to a link 64 (see Fig. 5), before described in connection with the operation of the feed plate 55.

It will, thus, be understood from what has been described that, as the motor 70 continuously operates, the conveyor rails are given a reciprocal motion as is the feed plate 55 which feeds assemblies of boards onto the conveyor table. On the back, or pick-up, stroke of the conveyor rails the dogs 98 and 102 (Fig. 16) are retracted. The parts are so positioned that the dogs at the end of the back or pick-up stroke will be behind an assembly of boards fed onto the conveyor table over the conveyor rails at that time. As the conveyor rails are moving backwardly on the pick-up part of the cycle, the feed plate 55 (Fig. 5) is moving toward the conveyor table to feed an assembly of boards thereonto.

The conveyor table comprises a number of plates, like plates 120 and 121, mounted on top of casting 100 on which the rails holding the feed dogs are mounted. On the ejecting movement of feed plate 55 as seen in Fig. 5, an assembly of boards 122 is moved onto the work table until they come to rest against an adjustable stop 123 (see Fig. 3), whereupon the second half of the feed cycle commences causing the feed dogs 98 and 102 to rise at the same time the rails are caused to move in a work feeding direction. The plates like plates 120 and 121 extend over the associated ones of outer rails 93 and 96 to hold said rails on their supporting surfaces on the casting 100. Stop member 123 (Fig. 3) is adjustable, by means of bolts 124 and 125, to accommodate different length of boards in such block assemblies. Knife blades 126 (Figs. 3 and 5) are mounted on a bar 127 pivoted to support arms 128 and 129. A clamping device 130 (Fig. 3) holds the end of the blades in the position shown in Fig. 5. Each of the blades 126 is resiliently held in place by a spring mounting as is shown in Fig. 17. It is the function of the blades 126 to hold the boards fed onto the table from moving backwardly into the feed hopper and to prevent the boards from buckling upwardly. Adjustment clamp 130 is provided so that the blades 126 may be raised or lowered according to the thickness of the boards being used in the manufacture of the flooring blocks. The feed plate 55 on block 59 is interchangeable to provide the proper throw for the length of the strips forming an assembly.

As shown in Fig. 6, in addition to the first positively actuated feeding dogs which engage the unit assemblies of boards as they are fed from the feed hopper, and move them toward the work stations, there are three other sets of resiliently mounted dogs which perform the function of feeding the units of assembled boards to said stations. The first movement of a unit of assembled boards in a work direction, caused by the feeding action of dogs 98 and 102, carries a unit assembly under a groove-cutting circular saw, the second feeding movement of such unit, effected by the first pair of resilient dogs, carries the unit under a channel-cutting, or dado, circular saw, the next pair of feeding dogs carries the unit assembly to the pressing station, and the third and last pair of resilient feeding dogs ejects the then completed flooring block from the machine. The first pair of resilient feeding dogs, said first pair feeding the unit assemblies from the hopper station under and past the grooving saw, may be taken as typical of the other two pairs of resilient feeding dogs which move the unit assemblies to the other associated stations. Referring to Fig. 6, dog 135, taken as typical, is pivoted on pin 136, extending beween rails 95 and 96, and is urged toward raised position by a spring 137 anchored in spacer block 138. The raising movement of the dog is limited by the corner of the lower extending part of the dog striking a pin extending between the rails. Spring 137 is received in a slot in casting 100. The other dogs are similarly mounted in pairs along the rails. On the backward movement of the rails, a pair of the dogs is depressed and rides under the next unit assembly to be picked up, and finally clears the rear end of the said next unit assembly, and the springs cause the dogs to extend upwardly above the work table surface level so that, on the forward movement of the conveyor feeding mechanism, the said unit will be moved to the next station where it comes to a stop. Dog 135 is typical of its associated one on the other side of the conveyor, and that pair of resilient feeding dogs is typical of the two other pairs which need not be further described.

Therefore, by means of the conveyor mechanism just described, unit assemblies are moved in succession, one at a time, to and past the work stations.

After a unit of boards is fed from the hopper, the first conveyor feed movement results in a groove being cut across the boards, the second movement results in a channel being cut across the boards, the third movement brings the boards to the pressing station, and the fourth movement ejects the completed block.

Tongued and grooved boards, or strips, are used, and, in placing them in the feed hopper, the boards comprising an assembly are placed with the tread surface down and are placed together in tongue and groove edge to edge joinder, with the boards oriented so that when fed onto the conveyor they will lie transversely thereof. Thus, the rear surfaces of the boards face upwardly and the joints between the boards run transversely across the direction of their movements on the conveyor.

In order to keep the boards from sliding lengthwise with respect to one another, during the manufacturing process, a groove is cut across the back of the boards by a circular saw and a guide knife positioned lengthwise of the machine above the work table surface rides in this groove, preventing any such relative motion between the boards of a unit assembly. The knife guide made of several sections extends from just beyond the grooving saw to a point beyond the press station so that the boards are held in alignment until the spline is pressed in place.

First, the grooving saw will be described. The grooving saw 150 (Figs. 3 and 6) is mounted on a shaft 151 of a motor 152. This motor is supported on a vertically adjustable block secured to the base 50 of the machine so that the height of the saw may be determined with respect to a given thickness of boards to be used in a particular operational run. The method of vertical adjustment of this saw is the same as that for the channel-cutting, or dado, saw next to be described and such adjustment means will be explained in connection therewith. The saw 150 is positioned to one side of the longitudinal center line of the unit assemblies passing thereunder so that the groove is spaced sidewardly from said center line on which the channel is to be cut. The unit assemblies are in motion while passing under the grooving saw, the first feeding movement of the conveyor carrying them from the feed hopper position under and beyond said grooving saw.

The unit assemblies then are moved to the next station during which movement the spline-receiving channel is cut by a circular saw 155 (Figs. 3, 6 and 7).

As the unit assemblies move out from under the groove-cutting saw 150, the groove meets the knife guide 156 (Fig. 5) supported in a blade holder 157 secured to a member 158 mounted for vertical and transverse adjustment in a bracket 159 secured to member 160 bolted to the casting 100. As seen in Fig. 9, the other end of guide knife 156 and member 157 is secured by a bolt 158a to portion 159a of the press which is adjustable for different sizes of blocks and which cooperates in conjunction with the adjustment of member 158 (Fig. 5) to keep the guide knife in longitudinal alignment with the direction of feed.

The channel-cutting, or dado, saw 155 (Fig. 7) is mounted on the shaft 160 of motor 161 supported, as shown in Figs. 7 and 8, on bracket 162 dovetailed into a channel 163 for vertical movement. The bracket 162 has mounted therein a shaft 164 provided with a hand wheel 165. On the other end of shaft 164 is a bevel gear 166 which meshes with another bevel gear 167 mounted on a shaft 168 threadedly mounted in bracket 169 held by the base 50. Adjustment of hand wheel 165, one way or another, will result in the raising or lowering of the saw 155. The channel is cut by the saw 155 in the unit assemblies as they are moving on the second feed step in their travel on the conveyor. The assemblies of boards which have passed under the channel-cutting saw are next fed one at a time to the pressing station where operations are performed on them while stationary.

Referring, first, to Fig. 1 the press is mounted on a separate base 170 held in alignment with base 50 as both are mounted on a common sub-base and are bolted to casting 100. Referring, now to Fig. 9, on top of base 170 is mounted an anvil 171 whose top surface is slightly convex (radius of 128 feet) for supporting the boards of a unit assembly stationed at the pressing station, and acts as a back-up for the downward pressing action of the press in forcing the spline into the channel.

Referring to Fig. 10, as a unit of boards 172 comes to position at the press station two resilient dogs, like dog 173, over which said unit has passed as it is being fed to the press station are raised upwardly by the action of springs, like spring 174, to prevent backward movement of the unit assembly during the pressing operation. Two stop blocks 175, and 176 (see also Fig. 9) are mounted on respective arms 177 and 178, and are normally in position to hold the unit assembly 172 on the opposite side from the dogs, like dog 173, to hold the boards of the unit together during the pressing operation.

Thus, when a unit assembly is at the pressing station the boards thereof are held tightly joined in tongue and groove relation and the knife 156 keeps the boards from relative movement longitudinally of one another.

The knife guide blades 156 (Fig. 10), which are typical, are resiliently mounted in member 157 by suspending bolts, like bolt 180 having a head 181 engaging slots in adjacent sections of the knife guide. Bolts, like bolt 180, enter into recesses formed in an associated member, like member 182, loosely mounted on vertical bolt 183 secured in member 157. Member 182, shown as typical, normally is held downwardly by compression spring 184 but may be raised upwardly by pressure on the knife guide blades associated therewith. Similar resilient mountings for the knife guides are provided for all the sections thereof.

Figure 13:
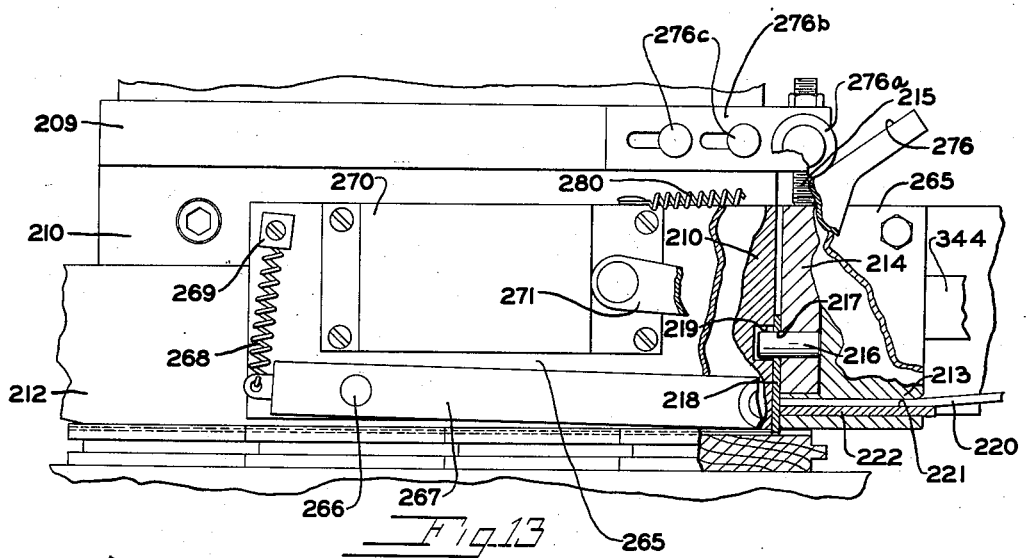
Fig. 13 is a detail, with parts broken away, of the pressing cycle initiating mechanism and the spline cut-off knife.

Referring to Figs. 1 and 9, a spline pressing device is provided, including a head 200 having a bearing 201 in which a shaft 202 is journaled. On the end of shaft 202 is an eccentric 203 rotating in a hole in a follower 204 which acts as a reciprocating drive member when shaft 202 is rotated. A vertical sliding member 205 is coupled to driver 204 by a ball and socket coupling 206. Vertical slide member 205 slides in grooved guides, like guide 207. In a cycle of operation, slide member 205 moves from a normal position shown in Fig. 9 in a downward movement and then at the end of the half cycle returns to its normal up position. Plate 205 has secured thereto, by bolts 205d and 205e (see Fig. 1), a member 208 having three vertical pin bolt passageways bored therein and each containing a constriction to prevent the withdrawal downwardly of the associated bolt. The middle passageway 205b (Fig. 9), typical of all three, has a constriction 205c preventing withdrawal downwardly of bolt 205a. All three pin bolts are threaded at the bottom and are screwed into pressing plate receiving block 209. As seen with respect to pin bolt 205a, springs, like spring 211, hold block 209 in down position but permit it to rise against the opposing springs. Therefore, member 209 is resiliently coupled to block 208 by heavy springs which act to absorb excessive shocks to the mechanism. Spline-pressing plate 210 secured to block 209 by screws, is guided between guide plates 212 and 213a (Fig. 19) secured to and supported by member 157 which holds the knife guide blades. Also extending from and secured to member 157 is a spline cut-off housing 213 in which a strike member 214 is mounted for vertical movement. Referring to Fig. 13, strike member 214 is given a blow by adjustable stud 215 when the press reaches the low point in its cycle of movement, and a pin 216, extending from strike block 214 through a hole 217 in a cut-off blade 218 and into a slot 219 in the pressing plate 210, in which it is movable slightly up and down, imparts the force of the blow to the knife blade 218 as the pressing plate is moving into contact with the spline. The spline material 220, formed in a V-shape with the ridge upward, is fed through a hole 221 in the spline cut-off housing 213 by a feeding action to be described. A shear plate 222 is secured to the bottom of the spline cut-off housing against which the knife blade 218 operates to shear the spline to the proper size. Referring to Fig. 10, the bolts 223 to 226, inclusive, are those that secure the spline cut-off housing to member 157 and, by moving the housing backward and forward on member 157 the length of the cut-off spline can be determined. For a given size flooring block a pressing plate of the appropriate length must be secured onto block 209. Clamping members 175 and 176 are adjustable in holes, such as hole 227, in their supporting arms to make it possible for them to be effective with the particular size of block being manufactured.

Figure 11:
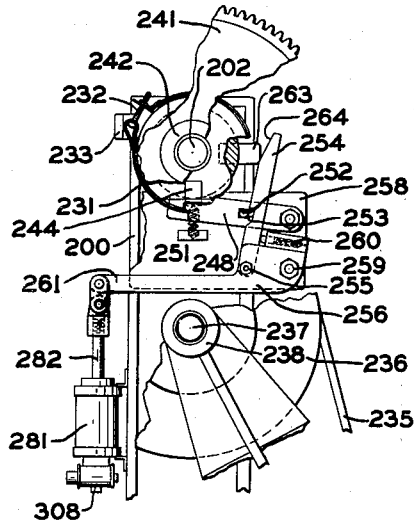
Fig. 11 is a portion of the press clutch and drive mechanism showing the single cycle clutch, with the clutch uncoupled, certain parts being broken away and others shown in section.
Figure 12:
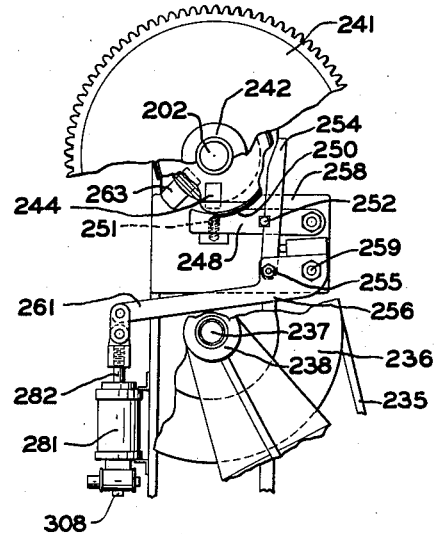
Fig. 12 is a view similar to Fig. 11 except that the parts are shown with the clutch coupled as during the first part of a cycle of operation of the press drive.

Referring to Fig. 9, shaft 202 is supported on its other end in bearing 228 secured to press head 200 and to frame member 229, and has on its end a clutch driven member 230 equipped with a brake band 231 (see, also, Figs. 11 and 12) adjusted by a tightening screw bolt 232 to bring the shaft to a halt promptly after the clutch drive, to be described, has been uncoupled. The brake band mechanism is secured to a block 233 (Fig. 11) secured to the press head 200. A constantly running motor 234 (Fig. 9) is coupled by belts 235 to pulley 236 secured on shaft 237 mounted in bearings 238 and 239. Gear 240 pinned to shaft 237 drives flywheel 241 rotatable on shaft 202, being retained thereon by collar 242. Bolted to flywheel 241 is clutch driving member 243. Clutch members 230 and 243 may be coupled together by a coupling pin 244 slidably mounted in clutch member 230 and engageable in between shoulders of chamfered depressible pins, like pins 245 and 246 (Fig. 20), forming a pair, there being three such pairs on clutch member 243. Pin 244 is resiliently urged by a spring 247 (Fig. 9) toward the clutch member 243, but between operative cycles of the machine it is held from moving in that direction by retaining member 248 (see, also, Figs. 11 and 12) which is interposed between the head of the pin and clutch member 230. To give the press a cycle of operation, member 248 is drawn downwardly, which releases pin 244 so that it will, within a third of a rotation of flywheel 241, ride up the chamfered surface and engage in between the shoulders of a pair of the depressible pins, thus coupling members 230 and 243 together for operation. As the complete cycle of operation of the press requires but one rotation of shaft 202, means is provided to withdraw the pin 244 from engagement with clutch member 243 just before the end of one complete rotation, the brake band 231 thereafter bringing the shaft 202 to a stop at its home position, adjustment screw 232 being provided to set the brake band with that end in view. The means for withdrawing the pin 244 from clutch member 243 is a knife-like edge 250 on member 248 (Figs. 11 and 12) which, when the pin is nearing the completion of one rotation, engages between the head of the pin 244 and the clutch member 230 and withdraws the pin from engagement with clutch member 243 which continues to rotate. In order for this to take place member 248 must be in its upper position to which it is urged by a spring 251. Member 248 has a stud 252 engageable by the shoulder of a notch 253 in a retaining pawl 254 spring-urged counterclockwise around a pivot 255 in an arm 256 pivoted to a plate 258 by a bolt 259. Retaining pawl 254 is normally urged into a position where it may engage stud 252 by means of a spring 260. When it is desired to set the machine in operation the forward end 261 of arm 256 is pulled downwardly which pulls against stud 252 removing arm 248 from effective position and allowing pin 244 to fall into place under influence of the spring 247 to engage clutch members 230 and 243 together. In order to permit the retracted member 248 to move to a position where it is effective to withdraw the pin 244, a striker member 263 fastened on clutch member 230 strikes against surface 264 of retaining pawl 254 at about the three-quarter point of the cycle, knocking retaining pawl 254 to ineffective position with respect to stud 252 and allowing member 248 to rise in response to the spring urging it upwardly, thus putting it in position where it can withdraw the pin 244 toward the completion of a single cycle of operation of the machine. The brake band then brings the shaft 202 to a halt with the press in up position.

It is a novel feature of this machine that a cycle of operation of the press does not take place unless a unit assembly of boards has been moved by the conveyor system to the pressing station. The conveyor feed is entirely independent of the press-operating mechanism, thus preventing any possible operation of the pressing unit and spline cut-off unit when no assembly of boards is in place. Referring to Fig. 1, bolted to the spline cut-off knife block 213 is a plate 265 (see, also, Fig. 13) which supports a stud 266 on which a lever 267 is rockably mounted, one end of the lever being coupled by a spring 268 to a spring anchor 269 which causes the arm, as seen in Fig. 13, to tend to rock clockwise. Also secured to plate 265 is switchbox 270 having an arm 271 having a square stud 272 (Fig. 21) engageable in a notch 273 of an arm 274 pivotally coupled at 275 to lever 267. Arm 274 has a cam surface 276 which is adapted to engage a roller stud 276a carried by a bracket plate 276b which is adjustably mounted on block 209 as by bolts 276c. Arm 274 is normally held in engagement against square stud 272 by means of a spring 280. When a unit assembly of boards is moved to the pressing station lever 267 is rocked counterclockwise, slightly, around stud 266 which temporarily rocks arm 271 of switch 270 to cause certain electrical connections with a solenoid to operate valves of air motor 281 for initiating a cycle of operation of the press. On the downward stroke of the press, the roller 276a engages cam surface 276 on arm 274 thereby rotating the arm 274 clockwise to disengage stud 272 from notch 273, allowing switch arm 271 to rotate clockwise to its normal position under action of a spring, thereby reversing the electrical contacts in switchbox 270. Inasmuch as the switch arm 271 (Fig. 13) has resumed its normal position the solenoid then is operated in the opposite direction causing upward movement of piston 282 and the return of the clutch tripping parts to their normal positions.

Referring to Fig. 22, the electrical connections will be described. Transformer 300 energized by an alternating power source furnishes current in the secondary 301 which is routed to solenoid winding 302 or solenoid winding 303, according as to whether switch 304 or switch 305 is closed. Switches 304 and 305 are ganged together as indicated by a dotted line 306 and are normally spring urged as represented by spring 307 in the position shown, wherein solenoid winding 302 is energized. When gang connector 306 is moved upwardly switch 305 is closed and switch 304 is open, energizing solenoid winding 303. The function of solenoid windings 302 and 303 is to operate certain air valves which route air, under pressure, from air source means connected to port 308 (Fig. 11), to one side of the piston contained in the air motor 281, or to the other side thereof.

At the same time solenoid operated air motor 281 is actuated to trip the single cycle operating means for putting the press through a cycle of operation, a similar air motor 309 (Fig. 1) is operated to drive piston 310 upwardly. Piston 310 is pivotally connected at 311 (Fig. 10) to arm 312 of a bell crank lever pivoted at 313. The other arm 314 (Fig. 10) of the bell crank lever is coupled at pivot 315 to a block 317 which has a pivot rod 316 connecting arms 177 and 178, which have mounted thereon flat clamping members 175 and 176 (see Fig. 9). The sliding block 317 is slidable backwardly and forwardly in a raceway 318. The forward ends of arms 177 and 178 have surfaces, like cam surface 320 which rides on roller 321. As pivot 311 is raised by operation of the air motor to the position shown in Fig. 10, the arms 177 and 178 are forced to the left, as seen in Fig. 10, and the camming surface 320 at the same time causes the arms to move upwardly so that the blocks 175 and 176 move into engagement with the leading edge of the unit assembly of boards stationed under the press. The solenoids operating air motor 309 (Fig. 1) are operated by the switch that operates the air motor for tripping the clutch cycling mechanism for the press.

Referring to Fig. 13, the roller 276a and the camming surface 276 are so related that the switch arm 271 does not return to normal position until the press has completed its downward movement and consequently does not return until the spline is in place. Thereafter, on return of the switch 271 to normal position, the pivot 311 (Fig. 10) drops, causing the retracting movement of arms 177 and 178 thus removing the blocks 175 and 176 from in front of the now completed flooring block so as to enable it to be ejected upon the next feeding movement of the conveyor system.

Referring to Fig. 2, beyond the pressing station I provide a spline tape supply, forming, and feeding mechanism mounted on framework 325. Mounted on the framework is a tape supply reel 326 from which a supply of metal tape is threaded over idler roller 327 and over an offset pulley 328 into a spline-forming mechanism, also mounted on framework 325. Referring to Figs. 2, 4, 14, 15, 18 and 23, there are a number of pairs of die rollers provided which successively operate upon the tape fed therethrough to form it to a V-shape cross-section with the cross-section ridge pointed upwardly. Fig. 23 shows a section on the line 23—23 of Fig. 2 indicating nesting rollers 329 and 330 between which the tape passes. There are four pairs of these roller dies which are progressively effective in forming the V-shape in the spline, the last of said roller pairs being shown in Fig. 15, the upper roller being numbered 331 and the lower roller being numbered 332. After being formed, the tape is passed over a series of straightening rolls 333, one of which is shown in Fig. 18. Adjusting nuts are provided, like adjusting nut 334, for each pair of the forming rollers, and like adjusting nut 335, for each of the guide rollers, to adjust the space between them and their positions to compensate for various thicknesses of spline material. A hand wheel 336 is provided for turning wheel 330 (see Fig. 23) and gear 337 fixed to shaft 337a meshed with corresponding gears on other rollers, corresponding to roller 339, so that by turning hand wheel 336 the starting end of a flat piece of metal tape may be threaded through the progressive dies to issue out of the guide rollers 333 and through feed grips 340 and 341, next to be described.

Fig. 14 shows feed grips 340 and 341 which operate upon a formed spline 220. Bar 343 is secured at one end to the spline-forming die assembly and secured at the other end onto boss 344 on the spline cut-off support box 213 (see Fig. 19), and has securely bolted thereto the feed grip 340 comprising a casing 345 within which are two opposed wedges 346 and 347 separated by ball bearings 348 and normally urged into wedging relationship with spline 220, passed through the casing, by a spring 349. As the spline is fed in the direction of the arrow the wedge 347 will be moved to the left, as seen in Fig. 14, releasing the wedging action and permitting the spline to pass in that direction. On the other hand, any attempt to move the spline in the opposite direction will result in the wedging action and clamping of the spline between block 347 and a V-shaped plate 342 formed so as not to harm the contour of the spline. The block 347 has a conforming groove therein to receive the upper surface of the spline. Grip 341 is slidably mounted on bar 343 and has an arrangement of parts like that of grip 340. When grip 341 moves in the direction of the arrow the spline is jammed and carried therewith. When moved in the direction opposite the direction of the arrow, the grip releases the spline so that a new section may be picked up. Movement of grip block 341 is effected by a link 350 pivoted at 351 to an actuating arm 352 (see, also, Fig. 2) pivoted at 353 to a support member 354. The link 352 is pivoted at 355 to a piston rod 356 of an air motor 357 which is operated by a solenoid actuated valve like those previously described in connection with the block clamping and clutch release mechanism. The switch actuating means which controls the feed stroke for grip 341 is shown in Fig. 9. Mounted on shaft 202 is a sprocket 360 coupled by sprocket chain 361 to a sprocket 362 mounted on a shaft 363 secured in a supporting member 364 and to which is secured a disc cam 365 whose periphery makes contact with a micro-switch 366 (Figs. 1 and 3) at about the beginning of the last quarter of the press cycle. The spline feeding movement takes place when the press is moving upwardly as the previously finished block is being ejected. The cut-off of this fed section of spline occurs on the next downward movement of the press and the backward movement of the spline grip occurs when stud 370 (Fig. 14) hits a micro-switch button 380 on the stationary grip 340. This micro-switch is shown at 381 in Fig. 4.

Figures 29, 30:
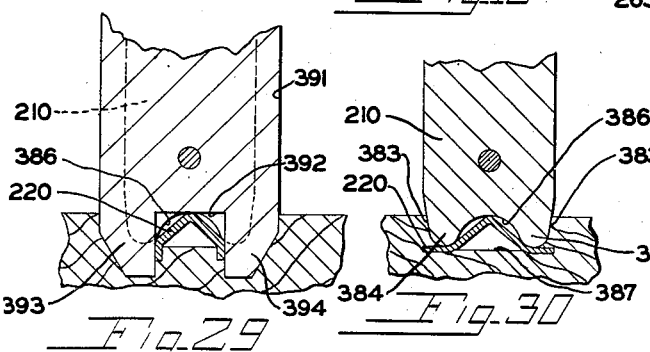
Fig. 29 is an enlarged cross-sectional view of a portion of the presser member, spline, and one of a group of boards showing the manner in which the projections on the presser member force the spline into the board.
Fig. 30 is a view similar to Fig. 29, but taken across another part of the presser member.

As already described, the V-shaped spline, with the V in inverted position, is pressed into the unit of boards by a spline pressing plate 210 which has a groove formed in its face to receive the V. This construction is shown most clearly in Fig. 30 where the bottom marginal portion of the pressing plate 210 is tapered inwardly on each side as indicated at 383, 383, so longitudinally extending ribs 384 and 385 are formed by the tapered portions 383, 383 and the groove 386 extending longitudinally along the center of the face of the spline pressing plate 210. With this arrangement, the beads on the face of the spline pressing plate engage the downwardly and outwardly sloping sides of the spline and force it into the sides of the channel 387, as illustrated in Fig. 30.

Inasmuch as the spline 220 is fed between the guide plates 212 and 213a at a point somewhat above the position of the boards, plungers 388, 388 are slidably mounted in cylindrically shaped recesses formed in the pressing plate 210 and normally forced outwardly by compression springs 389, 389 so the plungers 388, 388 engage the ridge of the spline as the pressing plate 210 is moved downwardly during the pressing cycle. The spline 220, being served from the reel by the spline cutter, is forced downwardly by the plungers 388, 388 into the channel 387 formed in the unit of boards. After the spline is in position, springs 389, 389 permit the plungers to move upwardly into the recesses of the pressing plate 210 as the face of the plate engages the spline.

With the arrangement thus far described, a certain amount of difficulty has been experienced due to longitudinal movement of the spline relative to the unit of boards, which permits the end boards to become loosened and removed from the spline.

To prevent relative longitudinal movement of the spline in the channel across a unit of boards, the spline pressing plate 210 has been provided with clinching devices so spaced points on the spline are forced into the wood in a different direction than the major portions of the sides of the spline. Referring to Figs. 24 and 29, it will be seen that a clinching plate 391 is secured to the end of the pressing plate toward which the unit of boards is carried. This clinching plate is somewhat wider than the width of the pressing plate 210 and rides in grooves 292, 292 (Fig. 26) formed in the guide plates 212 and 213a. The bottom of the clinching plate 391 is formed with a square cut notch 392 between downwardly extending projections 393 and 394 extending on opposite sides of the clinching plate 391 from the top of the groove to a point somewhat below the longitudinal ribs 384 and 385. With this arrangement, as shown most clearly in Fig. 29, the spline 220, at its end near the clinching plate 391, is clinched inwardly into the unit of boards at the bottom of the channel 387 formed therein. This portion of the spline beneath the clinching plate 391 is laterally offset with respect to other portions which are pressed outwardly into the sides of the channel 387 by the ribs 384 and 385 as indicated in Fig. 30.

A second clinching plate is provided on the other end of the pressing plate 210, and for purposes of convenience, is attached to the strike member 214 of the spline cut-off mechanism. This second clinching plate 395 has its bottom end portion 396 shaped similarly to the first clincher plate 391. The second clincher plate is of such a length that, when the strike member 214 is being moved downwardly by the stud 215 engaging the striking member 214, the second clinching plate 395 has the same position with respect to the spline pressing plate 210, as the position of the first clinching plate 391. Thus, the end of the spline 220 nearest to the spline cutting mechanism is also forced downwardly into the bottom of the channel 387 formed in the unit of boards so the two end boards are secured against relative longitudinal movement with respect to the spline 220, by reason of the fact that the spline, at these end boards, is laterally offset with respect to other portions of the spline. Stated another way, the clinched portions of the spline in the two end boards, which are forced downwardly into the bottom of the channel, are laterally offset with respect to the outwardly extending portions of the rest of the spline and thereby prevent relative longitudinal movement of the boards with respect to the spline.

While the foregoing arrangement is satisfactory in most cases, it may sometimes be desirable to have clinched portions of the spline engaging each of the boards of the unit. In such a case, additional clinching plates 397 and 397a (Fig. 25) may be assembled on the pressing plate 210 so they will have their projections, corresponding to projections 393 and 394 of the clinching plate 391, extending below the longitudinal ribs 384 and 385 on the face of the pressing plate 210. With such an arrangement, each of the four boards in a unit is clinched to the spline 220 so relative longitudinal movement of the spline is avoided. An illustration of this is found in Fig. 28 where the boards are shown with spline 220 in position and the laterally offset clinched portions 398a, 398b, 398c and 398d engaging each of the four boards of the assembled unit.

In operation of the machine, unit assemblies of the boards are stacked in the feed hopper and the units are fed one by one onto the conveyor from where they are advanced from station to station, finally coming to rest one assembly at a time under the press. At this time a section of spline has been fed over the longitudinal center line of the press between guide plates 212 and 213a (see Fig. 19). On arrival of a unit assembly of boards at the pressing station, lever 267 is raised, actuating switch 270 which causes air motors 281 and 309 to be energized. Air motor 309 raises the unit assembly stops 175 and 176, and air motor 281 allows a cycle of operation of the press mechanism, resulting in the descent of the pressing plate and the cutting off a length of the spline strip. The pressing plate, provided on the bottom with a longitudinal V groove, forces the V-shaped spline strip into the channel and spreads its sides outwardly into the sides of the channel in the wood strips for the sharp edges to become embedded. As the switch 270 is caused by the roller stud 276a to return to its normal position, thus reversing the directions of air motors 281 and 309, stops 175 and 176 are lowered, and the press plate rises. While the press plate is rising microswitch 366 is contacted, thereby energizing air motor 257 and causing a new length of the spline strip to be fed into the pressing station. Since the stops 175 and 176 are lowered, the way is clear for the finished block to be ejected. As the spline feeder 341 moves a new length of spline, it contacts microswitch 381 that reverses the air motor 357 and thereby determines the length of the spline being fed.

Referring to Fig. 2, there is provided a conveyor belt 400 running over rollers 401 and 402 and driven through belt 403 by a constantly running motor 404 onto which the completed blocks are ejected by the last feed dogs.

One of the chief advantages of my novel mechanism is the fact that the operating mechanism for the press, the spline cut-off, and the spline feeding means are operated in timed relation to the conveyor feed movement only by reason of the sensing lever being operated when the conveyor actually feeds a unit assembly of blocks to the pressing station. Heretofore, in machines of this type, movement has been so coordinated that the spline feeding, spline pressing and cut-off mechanism were repeatedly operated on each feeding movement of the conveyor, even though the actual feeding of a unit of boards may have stopped. Such action, without a unit assembly of boards under the press, results in pressing one spline on top of another, necessitating stoppage and overhaul.

I am aware that the structures herein described are susceptible of considerable variation without departing from the spirit of my invention, and therefore, I claim my invention broadly as indicated by the appended claims.

Having thus described my invention, what I claim as new and useful and desire to secure by United States Letters Patent, is:

1. In a machine for making wood flooring blocks from wood flooring boards, including a work support having a pressing station to which units of boards assembled edge to edge in block formation are fed, unit by unit, at periodic intervals, the combination of actuating means for feeding the boards to the pressing station; spline feeding means operable in a cycle to feed a length of spline material over a unit of boards at the pressing station; a spline cut-off and spline pressing means operable in a cycle of operation to cut off a length of spline and press it into a unit of boards at the pressing station to fasten the boards of the unit together; a control member moved by a unit of boards as it comes to position at the pressing station; and means given a cycle of operation by the actuating means, when the control member is moved, to cause a cycle of operation of the spline cut-off and spline pressing means followed by a cycle of operation of the spline feeding means.

2. In a machine for making wood flooring blocks including a work support which has a pressing station to which units of wood boards assembled in block formation are moved periodically, at which station each unit pauses for an interval of time, the combination of a spline feeding, spline cut-off, and spline pressing mechanism which in a cycle of operation cuts off a fed length of spline, presses the spline into the unit of boards to secure them together, and feeds a new length of spline to the pressing station ready for the next unit of boards; and means, including a control member which is moved by the moving of a unit of boards to position at the pressing station, for causing the spline cut-off, spline pressing and spline feeding mechanism to go through a cycle of operation.

3. In a machine for making wood flooring blocks from flooring boards formed into assembled block units by being fitted together edgewise, each unit having a channel formed transversely across the rear surface of the assembled boards thereof, the combination of a work support having a pressing station; means operable to position a length of spline material over the pressing station and in line with and over the channel of a unit to be positioned thereat; means operable to cut off and press the positioned length of spline into the channel of a unit positioned at the pressing station; and actuating means including a power source, a splining operation control device, and a unit sensing means, for causing in order the operation of the spline cut off and spline pressing means, and the spline positioning means when the unit sensing means senses a unit at the pressing position.

4. The combination of claim 3 in which the actuating means is reset for another operation upon completion of a block at the pressing station and the feeding of another length of spline material.

5. The combination of claim 3 in which the sensing means is a member normally in the path of the unit being moved to the pressing station and in which the sensing means is moved by the positioning of a unit at the pressing station, which initiates operation of the actuating means.

6. The combination of claim 5 in which the sensing means is a lever which is returned from a moved position, on removal of a finished block from the pressing station.

7. The combination of claim 6 in which the sensing means trips and by-passes an electric switch on its movement away from normal position and in which on the return movement of the lever to normal position it reengages the electric switch for another operation.

8. The combination of claim 3 in which the spline positioning means and spline cut-off means includes means for feeding a length of spline material from the supply source over the pressing station and means for cutting off the said length of material to form a spline piece approximately the width of the unit just before the press presses it into position.

9. In a machine for making wood flooring blocks from strips of wood laid edge to edge in block unit assemblies, each of which units has a channel cut across the strips on the reverse side thereof and which units are brought individually to a pressing station one at a time, the combination of a plurality of progressively acting pairs of die rolls through which a strip of metal may be fed toward the pressing station over the channel of a unit assembly of strips positioned there and forming said strip with a V-shaped cross section; means actuable to feed the strip in steps each of which steps causes the feeding of a length of strip necessary to form a spline for a unit assembly; pressing means including a cut-off knife operable in a cycle to cut off and press into the channel of a unit a length of the spline fed to the pressing station; actuating means; clutch means trippable to cause the pressing means and cut-off knife to make a single cycle of operation; sensing means actuated by the bringing of a unit assembly to position at the pressing station for tripping the clutch means; and spline feed actuating means operated to feed a length of spline at the conclusion of the cycle of operation of the pressing means and cut-off knife.

10. The combination of claim 9 in which the wood strips of a unit being pressed are held clamped between members moved together by power means controlled by the sensing means.

11. The combination of claim 9 in which the sensing means actuates a switch which operates a solenoid controlled air motor for tripping the clutch means.

12. The combination of claim 9 in which the sensing means actuates a switch which operates a solenoid controlled air motor for causing clamping members to come together to clamp the wood strips of a unit tightly together while the spline is being pressed in the channel.

13. The combination of claim 9 in which the length of spline fed in a cycle is determined by the position of an electric switch with relation to the excursion of a spline feeding grip which is operated by an air motor controlled by a solenoid controlled by the switch against which the grip makes contact.

14. In a machine for making wood flooring blocks from flooring boards formed into assembled block units by being fitted together edgewise, each unit having a channel formed transversely across one surface of the assembled boards thereof, a pressing machine for pressing a V-shaped spline into the channel comprising a reciprocable pressing plate, longitudinally extending beads along opposite sides of the pressing face of the plate forming a groove extending longitudinally of said face for engaging the sides of the inverted V-shaped spline, and projections extending beyond said beads for clinching portions of said spline into the boards.

15. In a machine for making wood flooring blocks from flooring boards formed into assembled block units by being fitted together edgewise, each unit having a channel formed transversely across one surface of the assembled boards thereof, a pressing mechanism for pressing a V-shaped spline into said channel comprising a reciprocable pressing plate, longitudinally extending beads along opposite sides of the pressing face of the plate forming a groove extending longitudinally of said face for engaging the sides of the inverted V-shaped spline, and a clincher plate on one end of said pressing plate having projections extending beyond the said beads for clinching the end portion of said spline to one of the boards of said unit.

16. In a machine for making wood flooring blocks from flooring boards formed into assembled block units by being fitted together edgewise, each unit having a channel formed transversely across one surface of the assembled boards thereof, a pressing mechanism for pressing a V-shaped spline into said channel comprising a reciprocable pressing plate, longitudinally extending beads along opposite sides of the pressing face of said plate forming a groove for engaging the sides of the inverted V-shaped spline, a clincher plate on one end of said pressing plate having projections extending beyond the said beads for clinching a portion of said spline into one of said boards, a spline cutting element at the other end of said pressing plate and movable therewith, and projections on said spline cutting element extending beyond said beads for clinching another portion of said spline into another of the boards of said unit.

17. In a machine for making wood flooring blocks from flooring boards formed into assembled block units by being fitted together edgewise, each unit having a channel formed transversely across one surface of the assembled boards thereof, a pressing mechanism for pressing a V-shaped spline into said channel comprising a reciprocable pressing plate, longitudinally extending beads along opposite sides of the pressing face of said plate forming a groove for engaging sides of the inverted V-shaped spline, and a plurality of projections spaced longitudinally of said pressing plate on opposite sides of the pressing face thereof and extending beyond said beads for clinching portions of said spline into the boards of said unit.

18. The mechanism defined in claim 17 wherein said projections extend from the furthest depression of the groove outwardly beyond said beads.

19. In a machine for making wood flooring blocks from flooring boards formed into assembled block units by being fitted together edgewise, each unit having a channel formed transversely across one surface of the assembled boards thereof, pressing mechanism for pressing a spline into said channel comprising a reciprocable pressing plate, reciprocable plungers slidable in recesses formed in said plate and opening at the pressing surface thereof, and resilient means normally forcing said plungers outwardly, whereby said plungers first engage the spline to resiliently force it into the channel prior to the application of pressure by said plate.

20. In a machine for making wood flooring units composed of a plurality of strips abutted edge to edge and splined together, comprising in combination a work support over which a plurality of strips are fed, edge to edge, to a movable pressing means from a supply stack, means for grooving the strips along one face in their movement to the pressing means, means for forming and feeding a length of spline from a supply strip in position over the grooving for being pressed therein by the pressing means to assemble a group of the strips, a cutter movable concomitantly with the pressing means for cutting off the length of spline from the supply strip, actuating means for the pressing means, the spline feed, and the cutter, a control means for causing a complete cycle of movement of the actuating means, and sensing means for the control means that is tripped by the group of strips to be splined.

21. In a machine for making wood flooring units composed of a plurality of strips abutted edge to edge and splined together, comprising in combination a work support over which a plurality of strips are fed, edge to edge, to a movable pressing means from a supply stack, means for feeding said strips, including a coupling connection between said means and a power driving means that is automatically disabled when the strips become jammed in the machine, means for grooving the strips along one face in their movement to the pressing means, means for forming and feeding a length of spline from a supply strip in position over the grooving for being pressed therein by the pressing means to assemble a group of the strips, a cutter for severing a length of spline from a supply strip, actuating means for the pressing means, the spline feed and the cutter, and a control means for the actuating means.

22. In a machine for making wood flooring units as set forth in claim 1 in which the coupling connection comprises readily detachable members.

CLIFTON W. REDIN.

REFERENCES CITED

The following references are of record in the file of this patent:

UNITED STATES PATENTS

| Number | Name | Date |
|---|---|---|
| 707,116 | Johnson | Aug. 19, 1902 |
| 1,471,246 | Daniels | Oct. 16, 1923 |
| 1,977,080 | Newton | Oct. 16, 1934 |
| 2,038,000 | Parker | Apr. 21, 1936 |

FOREIGN PATENTS

| Number | Country | Date |
|---|---|---|
| 15,342 | Great Britain | of 1904 |
| 159,508 | Germany | Apr. 8, 1905 |
| 6,998 | Great Britain | of 1911 |
| 499,563 | Great Britain | Jan. 25, 1939 |